United States Patent
Hanrahan et al.

(10) Patent No.: US 11,408,343 B1
(45) Date of Patent: Aug. 9, 2022

(54) TURBOSHAFT ENGINE WITH AXIAL COMPRESSOR

(71) Applicant: Raytheon Technologies Corporation, Farmington, CT (US)

(72) Inventors: Paul R. Hanrahan, Sedona, AZ (US); Daniel Bernard Kupratis, Wallingford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/313,618

(22) Filed: May 6, 2021

(51) Int. Cl.
| | |
|---|---|
| *F02K 3/02* | (2006.01) |
| *F02K 3/077* | (2006.01) |
| *F02K 3/11* | (2006.01) |
| *F02C 7/36* | (2006.01) |
| *F02C 7/052* | (2006.01) |
| *B64D 27/10* | (2006.01) |
| *F02C 6/20* | (2006.01) |
| *F02C 9/18* | (2006.01) |
| *B64C 27/12* | (2006.01) |

(52) U.S. Cl.
CPC .............. *F02C 7/052* (2013.01); *B64D 27/10* (2013.01); *F02C 6/20* (2013.01); *F02C 7/36* (2013.01); *F02C 9/18* (2013.01); *F02K 3/02* (2013.01); *F02K 3/077* (2013.01); *F02K 3/11* (2013.01); *B64C 27/12* (2013.01)

(58) Field of Classification Search
CPC ... F02K 3/02; F02K 3/077; F02K 3/11; F02C 7/36
See application file for complete search history.

(56) References Cited

U.S. PATENT DOCUMENTS

| | | | | |
|---|---|---|---|---|
| 2,672,726 | A * | 3/1954 | Wolf | F02C 3/36 60/225 |
| 3,296,800 | A * | 1/1967 | Keenan et al. | F02K 7/16 60/761 |
| 3,338,051 | A * | 8/1967 | Volpi | F23R 3/346 60/226.1 |
| 3,677,012 | A * | 7/1972 | Batscha | F02K 3/11 60/262 |
| 3,893,297 | A * | 7/1975 | Tatem, Jr. | F23R 3/20 60/266 |
| 3,987,621 | A * | 10/1976 | Sabatella, Jr. | F02K 3/11 60/262 |
| 4,010,608 | A * | 3/1977 | Simmons | F02K 3/077 60/226.3 |

(Continued)

*Primary Examiner* — William H Rodriguez
(74) *Attorney, Agent, or Firm* — Cantor Colburn LLP

(57) ABSTRACT

A turboshaft engine includes a core section extending between an inlet and an outlet of the turboshaft engine. The core section includes a compressor, a main combustor, and a main turbine, such that combustion products from the main combustor drives rotation of the turbine and the compressor. A power turbine is fluidly connected to the main turbine and driven by exhaust from the main turbine. A primary bypass is fluidly connected to the inlet and the outlet. The primary bypass directs a portion of an airflow entering the inlet around the core section to the outlet. A secondary bypass is located in the core section and is configured to divert a portion of a core airflow of the core section around the main combustor and the main turbine to the power turbine.

20 Claims, 2 Drawing Sheets

(56) References Cited

U.S. PATENT DOCUMENTS

| | | | | |
|---|---|---|---|---|
| 4,050,242 | A * | 9/1977 | Dusa | F02K 3/077 60/226.1 |
| 4,064,692 | A * | 12/1977 | Johnson | F02K 3/077 60/762 |
| 4,175,384 | A * | 11/1979 | Wagenknecht | F02K 3/075 60/226.3 |
| 4,928,480 | A | 5/1990 | Oliver et al. | |
| 5,305,599 | A * | 4/1994 | Marvin | F02K 1/15 60/226.3 |
| 5,404,713 | A * | 4/1995 | Johnson | F02K 1/825 60/226.3 |
| 5,694,768 | A * | 12/1997 | Johnson | F02K 3/077 60/226.3 |
| 7,614,210 | B2 * | 11/2009 | Powell | F02K 3/077 60/226.3 |
| 7,765,789 | B2 * | 8/2010 | Johnson | F02K 3/06 60/268 |
| 9,046,056 | B2 * | 6/2015 | Lerg | F02C 7/055 |
| 9,279,388 | B2 * | 3/2016 | Kupratis | F02K 3/075 |
| 9,500,129 | B2 | 11/2016 | Schmittenberg et al. | |
| 9,869,250 | B2 | 1/2018 | Hanrahan et al. | |
| 10,695,704 | B2 | 6/2020 | Mook et al. | |
| 2016/0208692 | A1 * | 7/2016 | Hanlon | F02K 3/077 |
| 2016/0298550 | A1 * | 10/2016 | Kupratis | F02C 9/18 |

* cited by examiner

TURBOSHAFT ENGINE WITH AXIAL COMPRESSOR

BACKGROUND

Exemplary embodiments pertain to the art of turboshaft engines, and in particular to compressors for and sand or other particulate separation in turboshaft engines.

Typical turboshaft engines utilize small compressors having a radial rotor formed from, for example, a titanium alloy which limits compressor temperature to about 900 degrees Fahrenheit. Further, when the turboshaft engine is sized for maximum rated power (MRP), this results in relatively high specific fuel consumption (SFC) which reduces available range. Also, in some configurations, turboshaft engines often include an inlet particle separation (IPS) to reduce ingestion of particulate matter such as sand, dust or the like. In a typical turboshaft engine, the airflow into the IPS is driven by a blower powered by an auxiliary gearbox, with the associated parasitic power draw from the turboshaft engine. Additionally, fine particles not captured by the IPS degrades downstream turbine airfoils.

BRIEF DESCRIPTION

In one embodiment, a turboshaft engine includes a core section extending between an inlet and an outlet of the turboshaft engine. The core section includes a compressor, a main combustor, and a main turbine, such that combustion products from the main combustor drives rotation of the turbine and the compressor. A power turbine is fluidly connected to the main turbine and driven by exhaust from the main turbine. A primary bypass is fluidly connected to the inlet and the outlet. The primary bypass directs a portion of an airflow entering the inlet around the core section to the outlet. A secondary bypass is located in the core section and is configured to divert a portion of a core airflow of the core section around the main combustor and the main turbine to the power turbine.

Additionally or alternatively, in this or other embodiments the secondary bypass is configured to divert a portion of the core airflow additionally around at least a portion of the compressor.

Additionally or alternatively, in this or other embodiments a secondary burner is located in the secondary bypass.

Additionally or alternatively, in this or other embodiments the secondary bypass includes a secondary bypass inlet manifold, a secondary bypass outlet manifold, and a plurality of secondary bypass passages extending between the secondary bypass inlet manifold and the secondary bypass outlet manifold.

Additionally or alternatively, in this or other embodiments a secondary burner is located in each secondary bypass passage of the plurality of secondary bypass passages.

Additionally or alternatively, in this or other embodiments the compressor is an axial compressor.

Additionally or alternatively, in this or other embodiments a driven component is operably connected to the power turbine and driven by rotation of the power turbine.

Additionally or alternatively, in this or other embodiments the driven component is operably connected to the power turbine via a tower shaft.

Additionally or alternatively, in this or other embodiments the primary bypass further directs the portion of the airflow entering the inlet around the power turbine.

Additionally or alternatively, in this or other embodiments the power turbine includes one or more features to selectably moderate and control the exhaust from the main turbine entering the power turbine.

In another embodiment, a method of operating a turboshaft engine includes operating a core section of the turboshaft engine. The core section extends between an inlet and an outlet of the turboshaft engine and includes a compressor, a main combustor, and a main turbine, such that combustion products from the main combustor drives rotation of the turbine and the compressor. Rotation of a power turbine fluidly connected to the main turbine is urged by exhaust from the main turbine. A portion of an airflow entering the inlet is diverted around the core section to the outlet via a primary bypass. A portion of a core airflow of the core section is diverted around the main combustor and the main turbine to the power turbine via a secondary bypass disposed in the core section.

Additionally or alternatively, in this or other embodiments a portion of the core airflow additionally is diverted around at least a portion of the compressor via the secondary bypass.

Additionally or alternatively, in this or other embodiments a secondary burner located in the secondary bypass is selectably operated to increase a power output of the turboshaft engine.

Additionally or alternatively, in this or other embodiments a driven component operably connected to the power turbine is driven by rotation of the power turbine.

Additionally or alternatively, in this or other embodiments the portion of the airflow entering the inlet is diverted around the power turbine via the primary bypass.

Additionally or alternatively, in this or other embodiments the exhaust from the main turbine entering the power turbine is selectably moderated via one or more features of the power turbine.

In yet another embodiment, a propulsion system includes a rotor and a turboshaft engine operably connected to the rotor to drive the rotor. The turboshaft engine includes a core section extending between an inlet and an outlet of the turboshaft engine. The core section includes a compressor, a main combustor, and a main turbine, such that combustion products from the main combustor drives rotation of the turbine and the compressor. A power turbine is fluidly connected to the main turbine and driven by exhaust from the main turbine. The power turbine is operably connected to the rotor to drive the rotor. A primary bypass is fluidly connected to the inlet and the outlet. The primary bypass directs a portion of an airflow entering the inlet around the core section to the outlet. A secondary bypass is located in the core section and is configured to divert a portion of a core airflow of the core section around the main combustor and the main turbine to the power turbine.

Additionally or alternatively, in this or other embodiments the secondary bypass is configured to divert a portion of the core airflow additionally around at least a portion of the compressor.

Additionally or alternatively, in this or other embodiments a secondary burner is located in the secondary bypass.

Additionally or alternatively, in this or other embodiments the rotor is operably connected to the power turbine via a tower shaft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
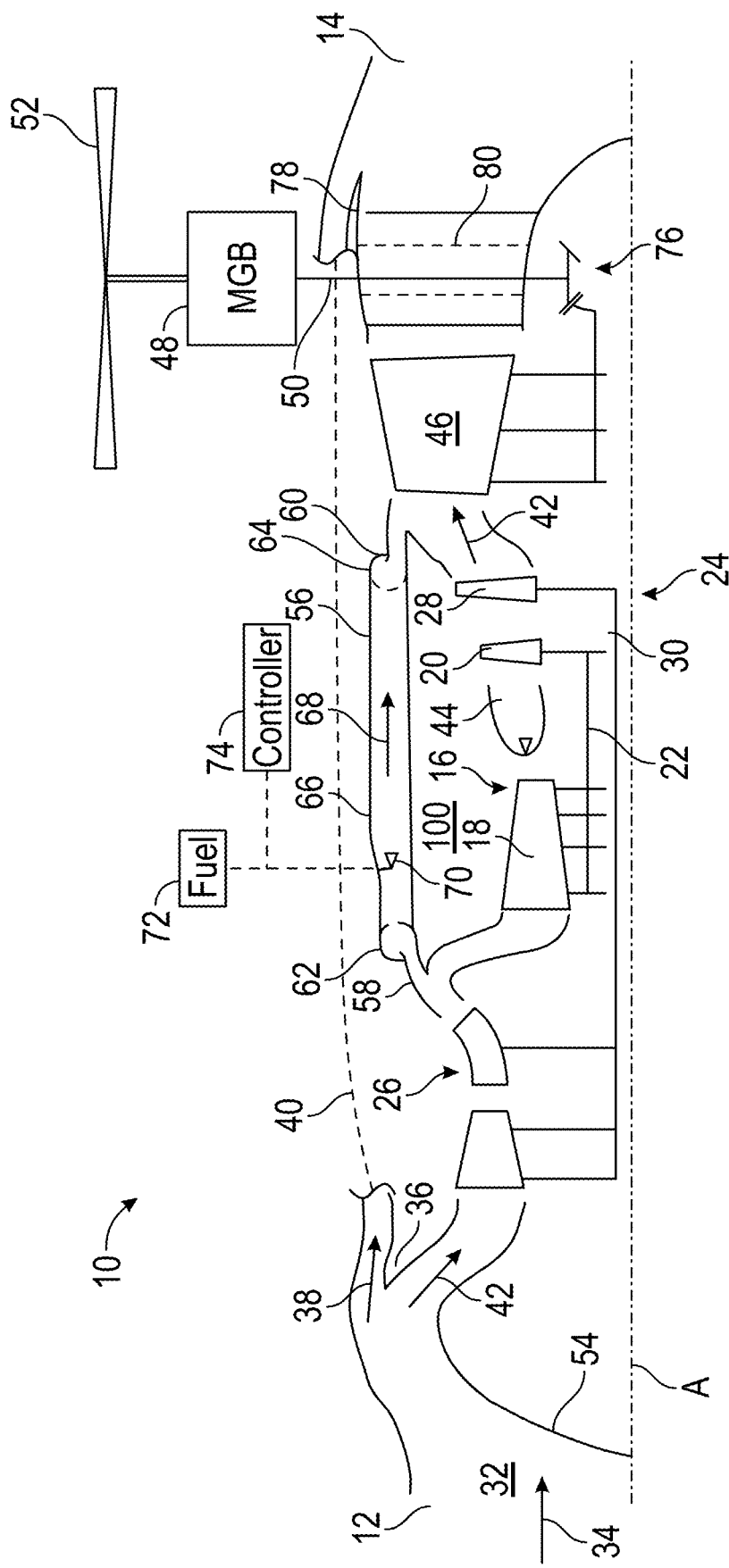
FIG. 1 is a schematic illustration of an embodiment of a turboshaft engine.

Illustrated in FIG. 1 is a schematic view of an embodiment of a turboshaft engine 10. The turboshaft engine 10 is arranged along a central longitudinal axis A and includes an inlet 12 at a first axial end and an outlet 14 at a second axial end opposite the first axial end. The turboshaft engine 10 in some embodiments is a two-spool configuration having a high spool 16 including a high pressure compressor 18 and a high pressure turbine 20 arrayed on a high spool shaft 22, and a low spool 24 including a low pressure compressor 26 and a low pressure turbine 28 arrayed on a low spool shaft 30. The high pressure compressor 18 is an axial compressor configuration, with the compressor rotors in some configuration formed from a nickel material. The high pressure compressor 18 is sized and configured for optimal operation at maximum continuous power (MCP) or cruise power, which is less than maximum rated power (MRP).

The inlet 12 includes a main inlet passage 32 into which an airflow 34 is directed. A splitter 36 directs a first portion of the airflow 34 as bypass airflow 38 along a bypass passage 40, and directs a second portion through a core section 100 of the turbine shaft engine 10 as core airflow 42. The core airflow 42 flows through the low pressure compressor 26 and high pressure compressor 18, then is combined with fuel and combusted at a primary combustor 44. The combustion products then are flowed across the high pressure turbine 20 and the low pressure turbine 28, which drives rotation of the high pressure compressor 18 and the low pressure compressor 26, respectively. The core airflow 42 is then directed across a power turbine 46 to drive rotation thereof, and out of the outlet 14. In some embodiments, the power turbine 46 includes one or more features to selectably moderate and control the core airflow 42 entering the power turbine 46. In some embodiments, this feature is one or more variable pitch vanes. The power turbine 46 is operably connected to a main gearbox 48 via, for example, a tower shaft 50. This connection transfers rotational energy from the power turbine 46 to the main gearbox 48, which is connected to, for example, a rotor 52 to generate lift for an aircraft. The bypass passage 40 extends circumferentially about the central longitudinal axis A, and along with the splitter 36 and a nosecone 54 at the inlet 12 is configured to collect particulates from the airflow 34 and direct the particulates along with the bypass airflow 38 toward the outlet 14, bypassing the compressor and turbine portions of the turboshaft engine 10. In some embodiments, the bypass airflow 38 and accompanying particulates enter the outlet downstream of the power turbine 46, thereby reducing erosion of the turbine components. The bypass airflow 38 is urged along the bypass passage 40 without the use of a blower in the bypass passage, and merely utilizes a relative velocity of the core airflow 42 at the outlet 14 to induce the bypass airflow 38 along the bypass passage 40 and to the outlet 14.

Figure 2:
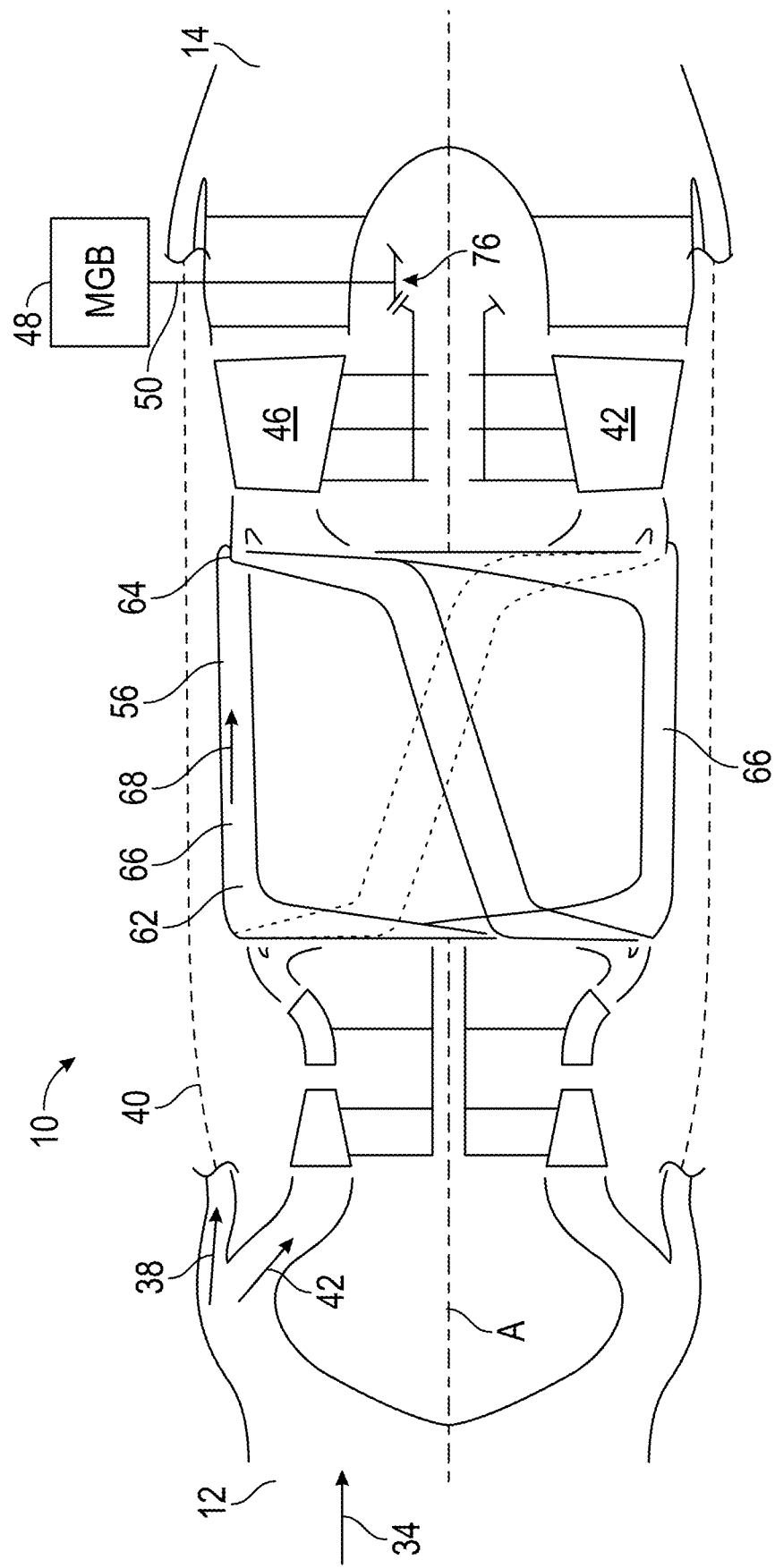
FIG. 2 is a schematic illustration of an embodiment of a secondary bypass of turboshaft engine.

The turboshaft engine 10 further includes a secondary bypass 56. The secondary bypass 56 is configured to remove fine particulates from the core airflow 42 which are not removed via the bypass passage 40. The secondary bypass 56 has a bypass inlet 58 located between the low pressure compressor 26 and the high pressure compressor 18, and has a bypass outlet 60 located between the low pressure turbine 28 and the power turbine 46, such that that a portion of the core airflow 42, as secondary bypass airflow 68, is directed along the secondary bypass 56 and bypasses the high pressure compressor 26, the primary combustor 44, the high pressure turbine 20 and the low pressure turbine 28. The secondary bypass 56 has a bypass inlet manifold 62 at or near the bypass inlet 58 and a bypass outlet manifold 64 similarly located at or near the bypass outlet 60. The bypass inlet manifold 62 and the bypass outlet manifold 64 extend circumferentially about the engine central longitudinal axis A, and are for example, toroidal in configuration. As best shown in FIG. 2, a plurality of secondary bypass passages 66 extend from the bypass inlet manifold 62 and the bypass outlet manifold 64. The bypass inlet manifold 62 distributes the secondary bypass airflow 68 to the plurality of secondary bypass passages 66, and the bypass outlet manifold 64 collects the secondary bypass airflow 68 from the plurality of secondary bypass passages 66. Some embodiments, such as shown in FIG. 2, include four secondary bypass passages 66 equally circumferentially spaced about the engine central longitudinal axis A. One skilled in the art will readily appreciate that other quantities of secondary bypass passages 66 may be utilized, and that the circumferential spacing of the secondary bypass passages 66 may be varied. Further, as illustrated in FIG. 2, the secondary bypass passages 66 may be skewed circumferentially between the bypass inlet manifold 62 and the bypass outlet manifold 64.

Referring again to FIG. 1, the secondary bypass passages 66 include a secondary burner 70. The secondary burner 70 is operably connected to a fuel source 72 and a controller 74, such as a full authority digital engine control (FADEC). The secondary burner 70 is configured such that, when operated together with the primary combustor 44, the turboshaft engine 10 can achieve maximum rated power (MRP). In operation, in normal conditions when engine power up to MCP is needed, the turboshaft engine 10 operates utilizing the primary combustor 44 without igniting the secondary burner 70. When power in excess of MCP is requested, such as at takeoff or during an operation maneuver, the controller 74 directs fuel from the fuel source 72 to the secondary burner 70 and ignites the secondary burner 70 so that engine power greater than MCP and up to MRP can be achieved, without increasing thermal stress on the high pressure compressor 18 and/or the high pressure turbine 20 and the low pressure turbine 28.

The power turbine 46 is connected to the tower shaft 50 in some embodiments via a bevel gear arrangement 76 and in the embodiment illustrated the tower shaft 50 extends through a turbine exhaust case 78 of the turboshaft engine 10. In some embodiments, the tower shaft 50 extends through a strut 80 of the turbine exhaust case 78. While in the embodiment illustrated in FIG. 1, the tower shaft 50 is at a substantially aft end of the turboshaft engine 10 at the turbine exhaust case 78, in other embodiments the tower shaft 50 is connected to the power turbine 46 at other axial locations of the engine. For example, the tower shaft 50 may extend through an inlet strut at the inlet 12 of the turbo shaft engine 10 in some embodiments as a two spool configuration with the power turbine 46 arrayed on a third shaft about central longitudinal axis A.

The configurations of the turboshaft engine 10 disclosed herein have benefits including lower specific fuel consumption at power conditions at MCP or below due to the reduced size of the high pressure compressor 18 when compared to a typical turboshaft engine, and improves the service life of the turbine components of the turboshaft engine 10 due to the capture of fine particulates via the secondary bypass 56.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A turboshaft engine, comprising:
a core section extending between an inlet and an outlet of the turboshaft engine, the core section including:
a compressor;
a main combustor; and
a main turbine, such that combustion products from the main combustor drives rotation of the turbine and the compressor;
a power turbine fluidly connected to the main turbine and driven by exhaust from the main turbine;
a primary bypass fluidly connected to the inlet and the outlet, the primary bypass directing a portion of an airflow entering the inlet around the core section to the outlet; and
a secondary bypass disposed in the core section and configured to divert a portion of a core airflow of the core section around the main combustor and the main turbine to the power turbine.

2. The turboshaft engine of claim 1, wherein the secondary bypass is configured to divert a portion of the core airflow additionally around at least a portion of the compressor.

3. The turboshaft engine of claim 1, wherein a secondary burner is disposed in the secondary bypass.

4. The turboshaft engine of claim 1, wherein the secondary bypass includes:
a secondary bypass inlet manifold;
a secondary bypass outlet manifold: and
a plurality of secondary bypass passages extending between the secondary bypass inlet manifold and the secondary bypass outlet manifold.

5. The turboshaft engine of claim 4, further comprising a secondary burner disposed in each secondary bypass passage of the plurality of secondary bypass passages.

6. The turboshaft engine of claim 1, wherein the compressor is an axial compressor.

7. The turboshaft engine of claim 1, further comprising a driven component operably connected to the power turbine and driven by rotation of the power turbine.

8. The turboshaft engine of claim 7, wherein the driven component is operably connected to the power turbine via a tower shaft.

9. The turboshaft engine of claim 1, wherein the primary bypass further directing the portion of the airflow entering the inlet around the power turbine.

10. The turboshaft engine of claim 1, wherein the power turbine includes one or more features to selectably moderate and control the exhaust from the main turbine entering the power turbine.

11. A method of operating a turboshaft engine, comprising:
operating a core section of the turboshaft engine, the core section extending between an inlet and an outlet of the turboshaft engine, and including:
a compressor;
a main combustor; and
a main turbine, such that combustion products from the main combustor drives rotation of the turbine and the compressor;
urging rotation of a power turbine fluidly connected to the main turbine by exhaust from the main turbine;
directing a portion of an airflow entering the inlet around the core section to the outlet via a primary bypass; and
diverting a portion of a core airflow of the core section around the main combustor and the main turbine to the power turbine via a secondary bypass disposed in the core section.

12. The method of claim 11, further comprising diverting a portion of the core airflow additionally around at least a portion of the compressor via the secondary bypass.

13. The method of claim 11, further comprising selectably operating a secondary burner disposed in the secondary bypass to increase a power output of the turboshaft engine.

14. The method of claim 11, further comprising driving a driven component operably connected to the power turbine by rotation of the power turbine.

15. The method of claim 11, further comprising directing the portion of the airflow entering the inlet around the power turbine via the primary bypass.

16. The method of claim 11, further comprising selectably moderating and controlling the exhaust from the main turbine entering the power turbine via one or more features of the power turbine.

17. A propulsion system, comprising:
a rotor; and
a turboshaft engine operably connected to the rotor to drive the rotor, the turboshaft engine including:
a core section extending between an inlet and an outlet of the turboshaft engine, the core section including:
a compressor;
a main combustor; and
a main turbine, such that combustion products from the main combustor drives rotation of the turbine and the compressor;

a power turbine fluidly connected to the main turbine and driven by exhaust from the main turbine, the power turbine operably connected to the rotor to drive the rotor;

a primary bypass fluidly connected to the inlet and the outlet, the primary bypass directing a portion of an airflow entering the inlet around the core section to the outlet; and a secondary bypass disposed in the core section and configured to divert a portion of a core airflow of the core section around the main combustor and the main turbine to the power turbine.

18. The propulsion system of claim 17, wherein the secondary bypass is configured to divert a portion of the core airflow additionally around at least a portion of the compressor.

19. The propulsion system of claim 17, wherein a secondary burner is disposed in the secondary bypass.

20. The propulsion system of claim 17, wherein the rotor is operably connected to the power turbine via a tower shaft.

* * * * *